United States Patent
Jung et al.

(10) Patent No.: US 9,663,606 B2
(45) Date of Patent: May 30, 2017

(54) METHOD FOR PREPARING RUBBER REINFORCED GRAFT COPOLYMER AND RUBBER REINFORCED GRAFT COPOLYMER PREPARED THEREBY

(71) Applicant: LG CHEM, LTD., Seoul (KR)

(72) Inventors: Yu Sung Jung, Daejeon (KR); Joo Byung Chai, Daejeon (KR); Eun Seon Park, Daejeon (KR); Tae Young Jeon, Daejeon (KR); Jin Ho Lee, Daejeon (KR); Young Min Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/774,693

(22) PCT Filed: Jul. 21, 2014

(86) PCT No.: PCT/KR2014/006615
§ 371 (c)(1),
(2) Date: Sep. 10, 2015

(87) PCT Pub. No.: WO2015/046729
PCT Pub. Date: Apr. 2, 2015

(65) Prior Publication Data
US 2016/0264703 A1     Sep. 15, 2016

(30) Foreign Application Priority Data

Sep. 30, 2013 (KR) .................. 10-2013-0116819
Apr. 3, 2014 (KR) .................. 10-2014-0039949

(51) Int. Cl.
*C08F 279/04* (2006.01)
*C08L 55/02* (2006.01)
*C08L 25/16* (2006.01)

(52) U.S. Cl.
CPC ............ *C08F 279/04* (2013.01); *C08L 25/16* (2013.01); *C08L 55/02* (2013.01)

(58) Field of Classification Search
None
See application file for complete search history.

(56) References Cited

U.S. PATENT DOCUMENTS

2007/0123648 A1* 5/2007 Lee .................. C08F 279/02
                                                                525/70

FOREIGN PATENT DOCUMENTS

| CN | 1455786 A | 11/2003 |
|---|---|---|
| CN | 1795210 A | 6/2006 |
| KR | 1993-0006082 B1 | 7/1993 |
| KR | 10-0653503 B1 | 12/2006 |
| KR | 10-2009-0020851 A | 2/2009 |
| KR | 10-2011-0071663 A | 6/2011 |
| KR | 10-2012-0021786 A | 3/2012 |

OTHER PUBLICATIONS

International search report for PCT/KR2014/006615 filed on Jul. 21, 2014.
Office Action from Chinese Patent Office for Application No. 201480013776.5, dated Dec. 26, 2016.

* cited by examiner

*Primary Examiner* — Jeffrey Mullis

(57) ABSTRACT

Disclosed is a method of preparing a rubber-reinforced graft copolymer and a rubber-reinforced graft copolymer prepared using the method. According to the present disclosure, provided is a method of preparing an α-methylstyrene-based rubber-reinforced graft copolymer which may enhance polymerization productivity and heat resistance, and a rubber-reinforced graft copolymer prepared using the method.

18 Claims, No Drawings

METHOD FOR PREPARING RUBBER REINFORCED GRAFT COPOLYMER AND RUBBER REINFORCED GRAFT COPOLYMER PREPARED THEREBY

CROSS REFERENCE TO RELATED APPLICATIONS

The present application is a U.S. National Stage of International Patent Application No. PCT/KR2014/006615 filed Jul. 21, 2014, which claims priority to Korean application number KR 10-2014-0039949, filed on Apr. 3, 2014, and Korean application number KR 10-2013-0116819, filed Sep. 30, 2013.

TECHNICAL FIELD

The present disclosure relates to a method of preparing a rubber-reinforced graft copolymer and a rubber-reinforced graft copolymer prepared using the method. More particularly, the present disclosure relates to a method of preparing a rubber-reinforced graft copolymer wherein polymerization productivity and heat resistance are enhanced by introducing rubber latex having a small average particle size when a rubber-reinforced graft copolymer comprising α-methylstyrene is prepared, and a rubber-reinforced graft copolymer prepared using the method.

In addition, the present disclosure relates to a thermoplastic resin composition comprising the rubber-reinforced graft copolymer and a heat resistant styrene-acrylonitrile-based copolymer, and exhibiting superior heat resistance.

BACKGROUND ART

In general, acrylonitrile-butadiene-styrene copolymers (ABS resins) have superior processability and graceful appearance properties as well as processability due to styrene, rigidity and chemical resistance due to acrylonitrile, and impact resistance due to butadiene rubber. Accordingly, acrylonitrile-butadiene-styrene copolymers are used in a variety of fields such as interior and exterior materials of vehicles, housings of home appliances, toys, etc.

In particular, in vehicle interior materials, etc., high thermal characteritics (e.g., heat deflection temperature (HDT)) are required. ABS resins to satisfy such thermal properties are generally prepared through emulsion polymerization or solution polymerization. In addition, an α-methylstyrene-acrylonitrile copolymer (AMSAN) having a high glass transition temperature (Tg) is melted with a rubber-reinforced graft copolymer (acrylonitrile-butadiene-styrene copolymer) prepared through emulsion polymerization within a predetermined rubber content range, and mixed with the same. In this case, in order to further enhance heat resistance, upon preparation of the rubber-reinforced graft copolymer, α-methylstyrene having a higher glass transition temperature may be used instead of styrene. However, when α-methylstyrene is used, a polymerization rate is dramatically decreased by low reactivity and polymerization stability decrease of α-methyl styrene in an emulsion polymerization step, and solid generation amount increases, whereby productivity and heat deflection temperature are decreased.

DISCLOSURE

Technical Problem

Therefore, the present invention has been made in view of the above problems, and it is one object of the present invention to provide a method of preparing a rubber-reinforced graft copolymer wherein polymerization productivity and heat resistance are enhanced by introducing rubber latex having an average particle size of 0.09 to 0.13 μm and comprising 85 to 99% by weight of a gel when a rubber-reinforced graft copolymer comprising α-methylstyrene is prepared, and a rubber-reinforced graft copolymer prepared using the method.

The above and other objects can be accomplished by the present invention described below.

Technical Solution

In accordance with one aspect of the present invention, provided is a method of preparing a rubber-reinforced graft copolymer, wherein (i) 40 to 50% by weight of rubber latex having an average particle size of 0.25 to 0.45 μm and comprising 80 to 95% by weight of a gel; (ii) 10 to 20% by weight of rubber latex having an average particle size of 0.09 to 0.13 μm and comprising 85 to 99% by weight of a gel; (iii) 20 to 35% by weight of α-methylstyrene; and iv) 5 to 20% by weight of a vinyl cyan monomer are emulsion-polymerized using water, an emulsifier, a molecular weight regulator, an initiator and an activator, wherein the total amount of the rubber latex of (i) and (ii) is input before initiation of polymerization, and the vinyl cyan monomer of (iv) is not input before initiation of polymerization, or the vinyl cyan monomer of (iv) is partially input and then a remainder thereof is input after initiation of polymerization.

In accordance with another aspect of the present invention, provided is a rubber-reinforced graft copolymer prepared using the method.

In accordance with another aspect of the present invention, provided is a method of preparing a thermoplastic resin composition, the method comprising emulsion-polymerizing 40 to 50% by weight of rubber latex having an average particle size of 0.25 to 0.45 μm and comprising 80 to 95% by weight of a gel; (ii) 10 to 20% by weight of rubber latex having an average particle size of 0.09 to 0.13 μm and comprising 85 to 99% by weight of a gel; (iii) 20 to 35% by weight of α-methylstyrene; and iv) 5 to 20% by weight of a vinyl cyan monomer using water, an emulsifier, a molecular weight regulator, a lipid-soluble initiator and an activator; and mixing the rubber-reinforced graft copolymer prepared through the emulsion polymerization and a heat resistant styrene-acrylonitrile-based copolymer, wherein, in the emulsion-polymerizing, the total amount of the rubber latex of (i) and (ii) is input before initiation of polymerization, and the vinyl cyan monomer of (iv) is not input before initiation of polymerization, or the vinyl cyan monomer of (iv) is partially input and then a remainder is input after initiation of polymerization.

In accordance with yet another aspect of the present invention, provided is a thermoplastic resin composition comprising the rubber-reinforced graft copolymer and a heat resistant styrene-acrylonitrile-based copolymer.

Advantageous Effects

As apparent from the foregoing, the present invention advantageously provides a method of preparing a rubber-reinforced graft copolymer comprising α-methylstyrene to enhance polymerization productivity and heat resistance, and a rubber-reinforced graft copolymer prepared using the method.

In addition, according to the present disclosure, a thermoplastic resin composition comprising the rubber-reinforced graft copolymer and a heat resistant styrene-acrylonitrile-based copolymer, and exhibiting superior heat resistance is advantageously provided.

BEST MODE

Hereinafter, the present invention is described in detail.

In a method of preparing a rubber-reinforced graft copolymer, (i) 40 to 50% by weight of rubber latex having an average particle size of 0.25 to 0.45 μm and comprising 80 to 95% by weight of a gel; (ii) 10 to 20% by weight of rubber latex having an average particle size of 0.09 to 0.13 μm and comprising 85 to 99% by weight of a gel; (iii) 20 to 35% by weight of α-methylstyrene; and iv) 5 to 20% by weight of a vinyl cyan monomer are emulsion-polymerized using water, an emulsifier, a molecular weight regulator, an initiator and an activator. Here, the total amount of the rubber latex of (i) and (ii) is input before initiation of polymerization, and the vinyl cyan monomer of (iv) is not input before initiation of polymerization, or the vinyl cyan monomer of (iv) is partially input and then a remainder thereof is input after initiation of polymerization.

When the amount of the rubber latex of (i) is less than 40% by weight, impact resistance decreases. When the amount of the rubber latex of (i) is greater than 50% by weight, a polymerization speed and stability decrease.

In addition, when the amount of the rubber latex of (ii) is less than 10% by weight, polymerization speed and polymerization stability is slightly enhanced. When the amount of the rubber latex of (ii) is greater than 20% by weight, impact resistance decreases.

In addition, when the rubber latex of (i) comprises a gel in an amount of less than 80% by weight, appearance properties are poor. When the rubber latex of (i) comprises a gel in an amount of greater than 95% by weight, impact resistance is poor.

In addition, when the rubber latex of (ii) comprises a gel in an amount of less than 85% by weight, appearance properties are poor. When the rubber latex of (ii) comprises a gel in an amount of greater than 99% by weight, impact resistance is poor.

In addition, the amount of the α-methylstyrene of (iii) is less than 20% by weight, heat resistance is slightly enhanced. When the amount of the α-methylstyrene of (iii) is greater than 35% by weight, reactivity decreases and thus polymerization time is extended, thereby decreasing economic efficiency.

In addition, when the amount of the vinyl cyan monomer of (iv) is less than 5% by weight or greater than 20% by weight, heat resistance is decreased.

In an embodiment, the initiator of (iv) is a lipid-soluble redox initiator. In this case, polymerization speed is advantageously affected.

In an embodiment, the rubber latex of (i) may have an average particle size of 0.25 to 0.35 μm or 0.3 to 0.4 μm. Within this range, impact resistance is superior.

In an embodiment, the rubber latex of (i) and (ii) may be conjugated-diene-based rubber latex. In this case, impact strength is superior.

In an embodiment, the conjugated-diene-based rubber latex is rubber latex prepared using one or more conjugated diene monomer types selected from the group consisting of 1,3-butadiene, isoprene, chloroprene and piperylene. Preferably, the conjugated-diene-based rubber latex is 1,3-butadiene rubber latex. In this case, impact strength is superior.

In an embodiment, the α-methylstyrene of (iii) is not input before initiation of polymerization, or the α-methylstyrene is partially input before initiation of polymerization and then a remainder thereof is input after initiation of polymerization. In this case, polymerization stability is superior.

In an embodiment, the α-methylstyrene of (iii) may be input in an amount of 10 to 50% by weight or 30 to 40% by weight before initiation of polymerization, based on the total amount of α-methylstyrene used in polymerization, and the remainder thereof may be input after initiation of polymerization. Within this range, polymerization stability is superior.

In an embodiment, the amount of the vinyl cyan monomer of (iv) is 10 to 15% by weight. Within this range, heat resistance is superior.

In an embodiment, the vinyl cyan monomer of (iv) may be input in an amount of 0 to 50% by weight or 30 to 50% by weight before initiation of polymerization, based on the total amount of the vinyl cyan monomer used in polymerization, and a remainder thereof may be input after initiation of polymerization. Within this range, heat resistance is superior.

In an embodiment, the vinyl cyan monomer of (iv) may be acrylonitrile, methacrylonitrile or a combination thereof, preferably acrylonitrile. In this case, reaction speed and heat resistance are advantageously affected.

In an embodiment, the water, the emulsifier, the initiator and the activator may be separately input before and after initiation of polymerization. In this case, a polymerization speed is high and polymerization stability is superior.

In an embodiment, the molecular weight regulator may be input after initiation of polymerization. In this case, superior molecular weight control effects are exhibited.

In an embodiment, a mercaptan-based molecular weight regulator may be used as the molecular weight regulator. In this case, molecular weight may be effectively controlled.

In an embodiment, the initiator and the activator may be additionally input after completing input of the total of the monomer. In this case, polymerization speed is advantageously affected.

In an embodiment, the emulsifier may be one or more types selected from the group consisting of anionic adsorption-type emulsifiers, non-ionic emulsifiers, reactive emulsifiers and reactive polymer emulsifiers. In this case, polymerization stability and latex storage stability are superior.

In an embodiment, the anionic adsorption-type emulsifier may be rosin-acid potassium, fatty acid potassium, sodium lauryl sulfonate, sodium alkyl benzene sulfonate, etc. In this case, polymerization stability and latex storage stability are superior.

In an embodiment, the lipid-soluble redox initiator is a redox based polymerization initiator comprising peroxide. In this case, polymerization speed is advantageously affected.

In an embodiment, the peroxide may be one or more types selected from the group consisting of hydrogene peroxide, cumene hydroperoxide, diisopropyl benzene hydroperoxide, tertiary butyl hydroperoxide and para methane hydroperoxide. In this case, a polymerization speed is advantageously affected.

The amount of the water is not specifically limited so long as the amount of the water is an amount (parts by weight) conventionally used in preparation of a rubber-reinforced graft copolymer.

In an embodiment, a polymerization conversion rate of the emulsion polymerization may be 97% or more. Within this range, heat resistance is superior.

In an embodiment, in the emulsion polymerization, solid generation amount is less than 0.1% by weight based on the total amount of solid. Within this range, property balance is superior and heat resistance is excellent.

In an embodiment, the method of preparing a rubber-reinforced graft copolymer may further comprise preparing a powder by coagulating inputting one or more coagulant type selected from the group consisting of sulfuric acid, $MgSO_4$, $CaCl_2$ and $Al_2(SO_4)_3$ to the rubber-reinforced graft copolymer latex prepared through the emulsion polymerization, and then washing an aggregate, as needed, dehydrating and drying the aggregate.

In an embodiment, the method of preparing a rubber-reinforced graft copolymer may comprise a) initiating polymerization by simultaneously inputting a lipid-soluble redox initiator and an activator after inputting rubber latex having an average particle size of 0.25 to 0.35 μm and comprising 80 to 95% by weight of a gel, rubber latex having an average particle size of 0.09 to 0.13 μm and comprising 85 to 99% by weight of a gel, α-methylstyrene, a vinyl cyan monomer, an emulsifier, deionized water and a molecular weight regulator to a reactor; b) continuously inputting a monomer emulsion comprising the remainder of the α-methylstyrene, the remainder of the vinyl cyan monomer, an emulsifier, a molecular weight regulator and deionized water, a lipid-soluble redox initiator and an activator, and reacting the same, after the polymerization of the initiating; and c) simultaneously inputting a lipid-soluble redox initiator and an activator to a reaction product of the continuously inputting, and further reacting the same.

In another embodiment, the method of preparing a rubber-reinforced graft copolymer may comprise a) initiating polymerization by simultaneously inputting 40 to 50 parts by weight of rubber latex having an average particle size of 0.25 to 0.45 μm and comprising 80 to 95% by weight of a gel, 10 to 20 parts by weight of rubber latex having an average particle size of 0.09 to 0.13 μm and comprising 85 to 99% by weight of a gel, 0 to 35 parts by weight of α-methylstyrene, to 5 parts by weight of acrylonitrile, 0 to 1 part by weight of an emulsifier, 0.01 to 1.0 parts by weight of a lipid-soluble redox initiator, 0.02 to 0.8 parts by weight of an activator and deionized water to a polymerization reactor; b) after initiation of polymerization of the initiating, reacting by continuously inputting a monomer emulsion comprising 0 to 35 parts by weight of the remainder of the α-methylstyrene, 5 to 15 parts by weight of the remainder of the acrylonitrile, 0 to 1 part by weight of an emulsifier, 0.01 to 2.0 parts by weight of a molecular weight regulator and deionized water, 0.01 to 1.0 parts by weight of a lipid-soluble redox initiator, and 0.01 to 0.5 parts by weight of an activator; and, c) after the reacting, reacting by simultaneously inputting 0.005 to 1.0 parts by weight of a lipid-soluble redox initiator and 0.01 to 0.5 parts by weight of an activator.

The rubber-reinforced graft copolymer of the present disclosure is prepared according to the method of preparing a rubber-reinforced graft copolymer.

A method of preparing a thermoplastic resin composition according to the present disclosure comprises a) emulsion-polymerizing 40 to 50% by weight of rubber latex having an average particle size of 0.25 to 0.45 μm and comprising 80 to 95% by weight of a gel; (ii) 10 to 20% by weight of rubber latex having an average particle size of 0.09 to 0.13 μm and comprising 85 to 99% by weight of a gel; (iii) 20 to 35% by weight of α-methylstyrene; and iv) 5 to 20% by weight of a vinyl cyan monomer using water, an emulsifier, a molecular weight regulator, an initiator and an activator; and b) mixing the rubber-reinforced graft copolymer prepared through the emulsion polymerization and a heat resistant styrene-acrylonitrile-based copolymer. In the emulsion-polymerizing, the total amount of the rubber latex of (i) and (ii) is input before initiation of polymerization, and the vinyl cyan monomer of (iv) is not input before initiation of polymerization, or the vinyl cyan monomer of (iv) is partially input and then a remainder is input after initiation of polymerization.

In an embodiment, the initiator of (iv) is a lipid-soluble redox initiator. In this case, polymerization speed is advantageously affected.

The thermoplastic resin composition of the present disclosure is prepared according to the method of preparing a thermoplastic resin composition described above.

In an embodiment, in the thermoplastic resin composition, the total amount of rubber may be 10 to 20% by weight or 15 to 20% by weight. Within this range, superior property balance and excellent heat resistance are exhibited.

In another embodiment, the thermoplastic resin composition according to the present disclosure may comprise to 50 parts by weight of the rubber-reinforced graft copolymer and 80 to 50 parts by weight of the heat resistant styrene-acrylonitrile-based copolymer.

In an embodiment, the heat resistant styrene-acrylonitrile-based copolymer may be a copolymer polymerized comprising 70 to 85% by weight of α-methylstyrene, 13 to 29% by weight of acrylonitrile and 1 to 2% by weight of styrene. In this case, superior property balance and excellent heat resistance are exhibited.

In another embodiment, the heat resistant styrene-acrylonitrile-based copolymer may be a copolymer polymerized comprising 60 to 80% by weight of α-methylstyrene, 15 to 35% by weight of acrylonitrile and 0.1 to 5% by weight of styrene. In this case, superior property balance and excellent heat resistance are exhibited.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

EXAMPLE

Example 1

<Rubber-Reinforced Graft Copolymer Preparation>
Initiation of Polymerization Step 45 parts by weight of rubber latex (hereinafter referred to as rubber latex A) having an average particle size 0.32 μm and comprising 85% by weight of a gel (based on a solid content), 15 parts by weight of rubber latex (hereinafter referred to as rubber latex B) having an average particle size of 0.12 μm and comprising 95% by weight of a gel (based on a solid content), 120 parts by weight of deionized water and 0.6 parts by weight of alkenyl succinic acid potassium as an emulsifier were input to a reactor, and temperature of the reactor was maintained at 50° C. Subsequently, 10 parts by weight of α-methylstyrene, 5 parts by weight of acrylonitrile, 0.087 parts by weight of sodium pyrophosphate, 0.11 parts by weight of dextrose, 0.002 parts by weight of ferrous sulfate and 0.2 parts by weight of cumyl peroxide were input batchwise, and then reaction temperature was elevated to 70° C. over 60 minutes.

Polymerization Reaction Step

After initiation of polymerization, a monomer emulsion including 10 parts by weight of deionized water, 20 parts by weight of α-methylstyrene, 5 parts by weight of acrylonitrile, 0.6 parts by weight of alkenyl succinic acid potassium as an emulsifier and 0.1 parts by weight of tertiary dodecylmercaptan, 0.019 parts by weight of sodium pyrophosphate, 0.025 parts by weight of dextrose, 0.001 parts by weight of ferrous sulfate, and 0.1 parts by weight of cumyl peroxide were continuously input over 120 minutes.

Polymerization Completion Step

After terminating the continuous input, 0.019 parts by weight of sodium pyrophosphate, 0.025 parts by weight of dextrose, 0.001 parts by weight of ferrous sulfate and 0.05 parts by weight of cumyl peroxide were input batchwise. Reaction temperature was elevated to 80° C. and then aging was carried out for 60 minutes. Subsequently, cooling to 60° C. was carried out and the reaction was terminated. Obtained rubber-reinforced graft copolymer latex was analyzed and results are summarized in Table 1 below.

<Thermoplastic Resin Composition Preparation>

2 parts by weight of sulfuric acid were added to the obtained rubber-reinforced graft copolymerization latex and coagulated. Subsequently, washing was carried out and hot-air-drying was carried out in a fluidized bed dryer, thereby preparing a powder. The prepared powder was mixed with the prepared heat resistant styrene-acrylonitrile-based copolymer (copolymer polymerized comprising 70% by weight of α-methylstyrene, 28% by weight of acrylonitrile and 2% by weight of styrene) through solution polymerization, and prepared into a pellet using an extruder. Subsequently, the prepared pellet was injected again and thus a specimen required for property measurement was prepared. In this case, a rubber content in the prepared specimen was 15% by weight, and properties of the specimen were measured and summarized in Table 2 below.

Example 2

A rubber-reinforced graft copolymer latex and a thermoplastic resin composition were prepared in the same manner as in Example 1, except that 40 parts by weight of latex A and 20 parts by weight of latex B were used.

Example 3

A rubber-reinforced graft copolymer latex and a thermoplastic resin composition were prepared in the same manner as in Example 1, except that, at an initiation of polymerization step, 50 parts by weight of latex A, 20 parts by weight of latex B, 5 parts by weight of α-methylstyrene and 2 parts by weight of acrylonitrile were used, and, at a polymerization step, 16 parts by weight of α-methylstyrene and 7 parts by weight of acrylonitrile were used.

Example 4

A rubber-reinforced graft copolymer latex and a thermoplastic resin composition were prepared in the same manner as in Example 1, except that, at an initiation of polymerization step, 6.5 parts by weight of α-methylstyrene and 3.5 parts by weight of acrylonitrile were used, and, at a polymerization step, 19.5 parts by weight of α-methylstyrene and 10.5 parts by weight of acrylonitrile were used.

Comparative Example 1

A rubber-reinforced graft copolymer latex and a thermoplastic resin composition were prepared in the same manner as in Example 1, except that, at an initiation of polymerization step, latex B was not used and 60 parts by weight of latex A was used.

Comparative Example 2

A rubber-reinforced graft copolymer latex and a thermoplastic resin composition were prepared in the same manner as in Example 1, except that, at an initiation of polymerization step, 50 parts by weight of latex A, 5 parts by weight of latex B, 11.5 parts by weight of α-methylstyrene and 5.5 parts by weight of acrylonitrile were used, and, at a polymerization step, 20 parts by weight of α-methylstyrene and 8 parts by weight of acrylonitrile were used.

Comparative Example 3

A rubber-reinforced graft copolymer latex and a thermoplastic resin composition were prepared in the same manner as in Example 1, except that, at an initiation of polymerization step, 35 parts by weight of latex A and 25 parts by weight of latex B were used.

Comparative Example 4

A rubber-reinforced graft copolymer latex and a thermoplastic resin composition were prepared in the same manner as in Example 1, except that, at an initiation of polymerization step, latex B comprising 95% by weight of a gel and having an average particle size of 0.05 μm was used.

Comparative Example 5

A rubber-reinforced graft copolymer latex and a thermoplastic resin composition were prepared in the same manner as in Example 1, except that, at an initiation of polymerization step, latex B comprising 95% by weight of a gel and having an average particle size of 0.20 μm was used.

Comparative Example 6

A rubber-reinforced graft copolymer latex and a thermoplastic resin composition were prepared in the same manner as in Example 1, except that, at an initiation of polymerization step, latex A comprising 85% by weight of a gel and having an average particle size of 0.2 μm was used.

Comparative Example 7

A rubber-reinforced graft copolymer latex and a thermoplastic resin composition were prepared in the same manner as in Example 1, except that, at an initiation of polymerization step, latex A comprising 83% by weight of a gel and having an average particle size of 0.5 μm was used.

Comparative Example 8

A rubber-reinforced graft copolymer latex and a thermoplastic resin composition were prepared in the same manner as in Example 1, except that, at an initiation of polymerization step, latex B comprising 70% by weight of a gel and having an average particle size of 0.12 μm was used.

Comparative Example 9

A rubber-reinforced graft copolymer latex and a thermoplastic resin composition were prepared in the same manner as in Example 1, except that, at an initiation of polymerization step, latex A comprising 70% by weight of a gel and having an average particle size of 0.32 μm was used.

Comparative Example 10

A rubber-reinforced graft copolymer latex and a thermoplastic resin composition were prepared in the same manner as in Example 1, except that, at an initiation of polymerization step, latex B including 97% by weight of a gel and having an average particle size of 0.32 μm was used.

Comparative Example 11

A rubber-reinforced graft copolymer latex and a thermoplastic resin composition were prepared in the same manner as in Example 1, except that, at an initiation of polymerization step, 5 parts by weight of α-methylstyrene, 5 parts by weight of styrene and 5 parts by weight of acrylonitrile were used, and, at a polymerization step, 10 parts by weight of α-methylstyrene, 10 parts by weight of styrene and 5 parts by weight of acrylonitrile were used.

Comparative Example 12

A rubber-reinforced graft copolymer latex and a thermoplastic resin composition were prepared in the same manner as in Example 1, except that, at an initiation of polymerization step, 20 parts by weight of α-methylstyrene and 4 parts by weight of acrylonitrile were used, and, at a polymerization step, 16 parts by weight of α-methylstyrene and 0 parts by weight of acrylonitrile were used.

Test Example

Properties of the prepared rubber-reinforced graft copolymer latex and the thermoplastic resin compositions prepared according to the examples and the comparative examples were measured according to methods below, and results are summarized in Tables 1 to 6 below.

Average particle size: Measured using intensity Gaussian distribution (Nicomp 380) according to a dynamic laser light scattering method.

Gel content: Measured after stirring for 24 hours in acetone and then centrifuging.

Polymerization conversion rate: 2 g of the latex in the each step was dried in a 150° C. hot-air-dryer for 15 minutes, and then weighed to find a total solid content (TSC), followed by calculating a polymerization conversion rate according to an equation below.

Polymerization conversion rate=TSC×(parts by weight of monomer and supplementary materials which are input)/100−(parts by weight of supplementary materials that are input, except for a monomer)

Polymerized solid: Rubber-reinforced graft copolymer stability was represented as % relative to a total solid content weight by theoretically finding the amount of a solid obtained by filtering latex obtained after polymerization through a 100 mesh screen.

Ratio of generated aggregate=Weight of aggregate generated in a reactor/total weight of input monomer*100

Izod impact strength: The thickness of specimen was adjusted to ¼" and Izod impact strength was measured according to ASTM D256. Results are in Kg·cm/cm.

Heat resistance (heat deflection temperature (HDT)): Heat deflection temperature was measured according to ASTM D648.

Surface gloss: Measured at an angle of 45° according to ASTM D528.

TABLE 1

| | | Example 1 | Example 2 | Example 3 | Example 4 |
|---|---|---|---|---|---|
| Composition of rubber-reinforced graft copolymer | Rubber latex A | 45 | 40 | 50 | 45 |
| | Rubber latex B | 15 | 20 | 20 | 15 |
| | AMS | 30 | 30 | 21 | 26 |
| | AN | 10 | 10 | 9 | 14 |
| | Total | 100 | 100 | 100 | 100 |
| Polymerization conversion rate (%) | | 97.2 | 97.5 | 97.2 | 98.2 |
| Polymerization solid (%) | | 0.05 | 0.02 | 0.01 | 0.04 |

TABLE 2

| | | | Comparative Example 1 | Comparative Example 2 | Comparative Example 3 | Comparative Example 4 | Comparative Example 5 | Comparative Example 6 |
|---|---|---|---|---|---|---|---|---|
| Composition of rubber-reinforced graft copolymer | Rubber latex A | Rubber latex | 60 | 50 | 35 | 45 | 45 | 45 |
| | | Gel content | 85 | 85 | 85 | 85 | 85 | 85 |
| | | Particle size | 0.32 | 0.32 | 0.32 | 0.32 | 0.32 | 0.2 |
| | Rubber latex B | Rubber latex | 0 | 5 | 25 | 15 | 15 | 15 |
| | | Gel content | 95 | 95 | 95 | 95 | 95 | 95 |

TABLE 2-continued

|  |  |  | Comparative Example 1 | Comparative Example 2 | Comparative Example 3 | Comparative Example 4 | Comparative Example 5 | Comparative Example 6 |
|---|---|---|---|---|---|---|---|---|
|  |  | Particle size (μm) | 0.12 | 0.12 | 0.12 | 0.05 | 0.2 | 0.12 |
|  | Monomer | AMS | 30 | 31.5 | 30 | 30 | 30 | 30 |
|  |  | SM |  |  |  |  |  |  |
|  |  | AN | 10 | 13.5 | 10 | 10 | 10 | 10 |
|  | Total |  | 100 | 100 | 100 | 100 | 100 | 100 |
|  | Polymerization conversion rate (%) |  | 96.3 | 94.4 | 94.1 | 97.3 | 95.3 | 97.7 |
|  | Polymerization solid (%) |  | 1.50 | 1.91 | 0.02 | 0.73 | 0.55 | 0.88 |

TABLE 3

|  |  |  | Comparative Example 7 | Comparative Example 8 | Comparative Example 9 | Comparative Example 10 | Comparative Example 11 | Comparative Example 12 |
|---|---|---|---|---|---|---|---|---|
| Composition of rubber-reinforced graft copolymer | Rubber latex A | Rubber latex | 45 | 45 | 45 | 45 | 45 | 45 |
|  |  | Gel content | 85 | 85 | 70 | 90 | 85 | 85 |
|  |  | Particle size | 0.5 | 0.32 | 0.32 | 0.32 | 0.32 | 0.32 |
|  | Rubber latex B | Rubber latex | 15 | 15 | 15 | 15 | 15 | 15 |
|  |  | Gel content | 95 | 70 | 95 | 95 | 95 | 95 |
|  |  | Particle size (μm) | 0.12 | 0.12 | 0.12 | 0.12 | 0.12 | 0.12 |
|  | Monomer | AMS | 30 | 30 | 30 | 30 | 10 | 30 |
|  |  | SM |  |  |  |  | 20 |  |
|  |  | AN | 10 | 10 | 10 | 10 | 10 | 4 |
|  | Total |  | 100 | 100 | 100 | 100 | 100 | 100 |
|  | Polymerization conversion rate (%) |  | 92.1 | 97.1 | 96.9 | 97.1 | 98.1 | 88.1 |
|  | Polymerization solid (%) |  | 0.01 | 0.01 | 0.03 | 0.09 | 0.01 | 1.29 |

As shown in Tables 1 to 3, it can be confirmed that the rubber-reinforced graft copolymers (Examples 1 to 4) of the present disclosure exhibit higher polymerization conversion rates and dramatically decreased polymerization solid contents, when compared with the rubber-reinforced graft copolymers not including rubber latex B (Comparative Examples 1 to 12).

TABLE 4

|  | Example 1 | Example 2 | Example 3 | Example 4 |
|---|---|---|---|---|
| Impact strength ¼ (Kg · cm/cm) | 18.8 | 18.1 | 18.5 | 19.0 |
| HDT (° C.) | 107.5 | 107.7 | 104.1 | 106.9 |
| Gloss | 100.9 | 100.9 | 101.3 | 101.2 |

TABLE 5

|  | Comparative Example 1 | Comparative Example 2 | Comparative Example 3 | Comparative Example 4 | Comparative Example 5 | Comparative Example 6 |
|---|---|---|---|---|---|---|
| Impact strength ¼ (Kg · cm/cm) | 19.8 | 19.3 | 12.3 | 13.4 | 15.2 | 11.1 |
| HDT (° C.) | 104.5 | 103.8 | 105.7 | 106.1 | 106.0 | 103.5 |
| Gloss | 98.6 | 98.8 | 102.1 | 102.7 | 100.0 | 100.8 |

TABLE 6

|  | Comparative Example 7 | Comparative Example 8 | Comparative Example 9 | Comparative Example 10 | Comparative Example 11 | Comparative Example 12 |
|---|---|---|---|---|---|---|
| Impact strength ¼ (Kg · cm/cm) | 22.9 | 18.9 | 20.3 | 14.1 | 18.9 | 16.3 |
| HDT (° C.) | 103.5 | 103.2 | 105.8 | 107.8 | 100.1 | 101.1 |
| Gloss | 98.6 | 97.1 | 95.2 | 100.1 | 100.7 | 88.9 |

As shown in Tables 4 to 6, it can be confirmed that the thermoplastic resin compositions according to the present disclosure (Examples 1 to 4) exhibit superior impact strength, heat resistance and appearance properties, and, in particular, excellent property balance, when compared with the thermoplastic resin compositions not including the rubber-reinforced graft copolymer (Comparative Examples 1 to 12).

What is claimed is:

1. A method of preparing a rubber-reinforced graft copolymer, wherein (i) 40 to 50% by weight of rubber latex having an average particle size of 0.25 to 0.45 μm and a gel content of 85 to 95% by weight, based on a solid content; (ii) 10 to 20% by weight of rubber latex having an average particle size of 0.09 to 0.13 μm and a gel content of 85 to 99% by weight, based on a solid content; (iii) 20 to 35% by weight of α-methylstyrene; and (iv) 5 to 20% by weight of a vinyl cyan monomer are emulsion-polymerized using water, an emulsifier, a molecular weight regulator, an initiator and an activator,
wherein a total amount of the rubber latex of (i) and (ii) is input before initiation of polymerization, and the vinyl cyan monomer of (iv) is not input before initiation of polymerization, or the vinyl cyan monomer of (iv) is partially input before initiation of polymerization and then a remainder thereof is input after initiation of polymerization,
wherein the molecular weight regulator is input after initiation of polymerization,
wherein the emulsifier comprises a potassium salt of a fatty acid, and
wherein the initiator comprises a lipid-soluble redox initiator.

2. The method according to claim 1, wherein the rubber latex of (i) has an average particle size of 0.25 to 0.35 μm.

3. The method according to claim 1, wherein the rubber latex of (i) and (ii) is conjugated-diene-based rubber latex.

4. The method according to claim 3, wherein the conjugated-diene-based rubber latex is rubber latex prepared with one or more conjugated diene monomers selected the group consisting of 1,3-butadiene, isoprene, chloroprene and piperylene.

5. The method according to claim 1, wherein the α-methylstyrene of (iii) is not input before initiation of polymerization, or the α-methylstyrene is partially input before initiation of polymerization and then a remainder thereof is input after initiation of polymerization.

6. The method according to claim 1, wherein the α-methylstyrene of (iii) is input in an amount of 10 to 50% before initiation of polymerization, based on a total amount of the α-methylstyrene used in polymerization, and a remainder thereof is input after initiation of polymerization.

7. The method according to claim 1, wherein an amount of the vinyl cyan monomer of (iv) is 10 to 15% by weight.

8. The method according to claim 1, wherein the vinyl cyan monomer of (iv) is input in an amount of 0 to 50%, based on a total amount of the vinyl cyan monomer used in polymerization, before initiation of polymerization and a remainder thereof is input after initiation of polymerization.

9. The method according to claim 1, wherein the vinyl cyan monomer of (iv) is acrylonitrile, methacrylonitrile or a combination thereof.

10. The method according to claim 1, wherein the water, the emulsifier, the initiator and the activator are separately input before and after initiation of polymerization.

11. The method according to claim 1, wherein the initiator and the activator are additionally input after inputting a total amount of the monomer.

12. The method according to claim 1, wherein the emulsion polymerization has a polymerization conversion rate of 97% or more.

13. The method according to claim 1, further comprising, after coagulating by inputting one or more coagulant selected from the group consisting of sulfuric acid, $MgSO_4$, $CaCl_2$ and $Al_2(SO_4)_3$ to rubber-reinforced graft copolymer latex prepared through the emulsion polymerization, washing and drying an aggregate.

14. A rubber-reinforced graft copolymer prepared using the method according to claim 1.

15. A method of preparing a thermoplastic resin composition, the method comprising:
emulsion-polymerizing 40 to 50% by weight of rubber latex having an average particle size of 0.25 to 0.45 μm and a gel content of 80 to 95% by weight, based on a solid content; (ii) 10 to 20% by weight of rubber latex having an average particle size of 0.09 to 0.13 μm and a gel content of 85 to 99% by weight, based on a solid content; (iii) 20 to 35% by weight of α-methylstyrene; and (iv) 5 to 20% by weight of a vinyl cyan monomer using water, an emulsifier, a molecular weight regulator, an initiator and an activator; and
mixing the rubber-reinforced graft copolymer prepared through the emulsion polymerization and a heat resistant styrene-acrylonitrile-based copolymer,
wherein, in the emulsion-polymerizing, a total amount of the rubber latex of (i) and (ii) is input before initiation of polymerization, and the vinyl cyan monomer of (iv) is not input before initiation of polymerization, or the vinyl cyan monomer of (iv) is partially input before initiation of polymerization and then a remainder is input after initiation of polymerization,
wherein the molecular weight regulator is input after initiation of polymerization,
wherein the emulsifier comprises a potassium salt of a fatty acid, and wherein the initiator comprises a lipid-soluble redox initiator.

16. A thermoplastic resin composition according to the method of claim 15.

17. The thermoplastic resin composition according to claim 16, wherein the thermoplastic resin composition comprises 10 to 30% by weight of rubber.

18. The method according to claim 1, wherein the emulsifier is a potassium salt of alkenyl succinic acid, and
wherein the initiator is cumyl peroxide.

* * * * *